United States Patent Office 3,232,962
Patented Feb. 1, 1966

3,232,962
19-NOR-Δ⁵⁽¹⁰⁾-PREGNENES
Albert Bowers, Pierre Crabbé, and John Edwards, Mexico City, Mexico, assignors to Syntex Corporation, Panama, Panama, a corporation of Panama
No Drawing. Filed Nov. 30, 1962, Ser. No. 241,172
7 Claims. (Cl. 260—397.3)

The present invention relates to certain new cyclopentanophenanthrene derivatives and to the method for making the same.

More particularly, the present invention relates to the novel $\Delta^{5(10)}$-19-nor-androstenes and $\Delta^{5(10)}$-19-nor-pregnenes with abnormal configuration at $C_9$ represented by the following formulas:

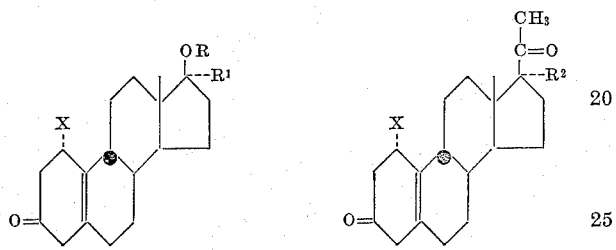

In the above formulas, R represents hydrogen or a hydrocarbon carboxylic acid radical of less than 12 carbon atoms; $R^1$ represents hydrogen, a lower alkyl, lower alkenyl or lower alkinyl radical of up to 6 carbon atoms; $R^2$ represents hydrogen or a free or esterified hydroxyl group and X represents hydrogen or methyl.

The acyl groups above referred to are derived from hydrocarbon carboxylic acids containing less than 12 carbon atoms which may be saturated or unsaturated, of straight, branched, cyclic or cyclicaliphatic chain, aromatic and may be substituted by functional groups such as hydroxy, alkoxy containing up to 5 carbon atoms, acyloxy contaning up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The compounds of the present invention are potent progestational agents with high oral activity, useful in several hormonal disturbances such as amenorrhea, dysmenorrhea, maintenance of pregnancy, and fertility control.

The $\Delta^{5(10)}$-19-nor-9β-androstane derivatives are obtained by the method illustrated by the following sequence of reactions:

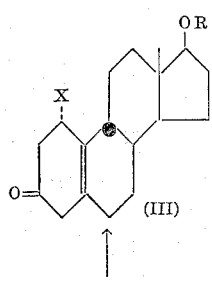

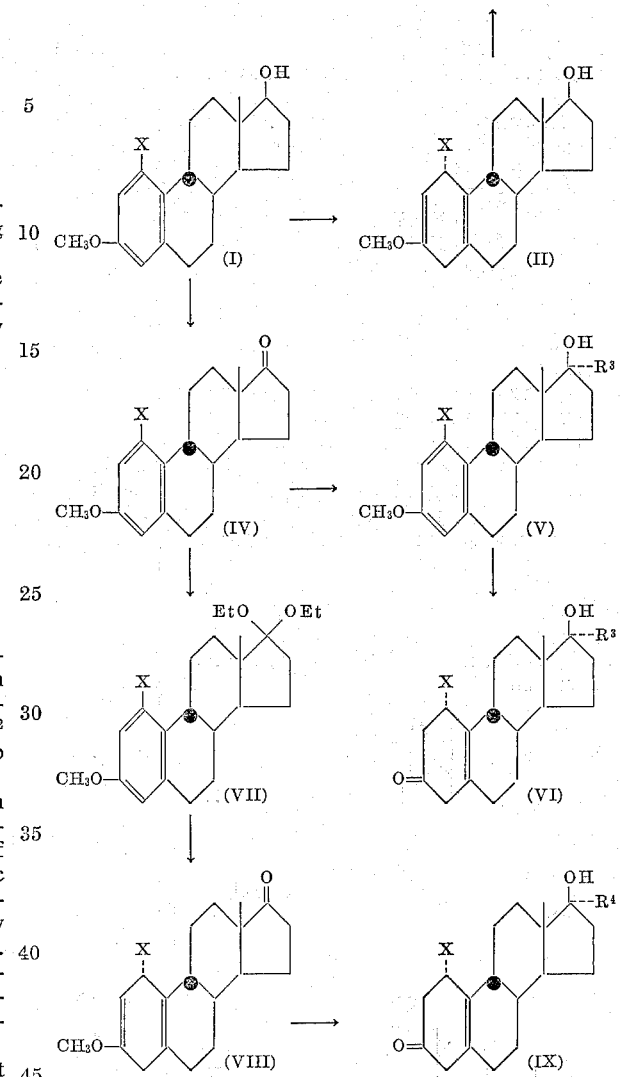

In the above formulas, R and X have the same meaning as heretofore set forth; $R^3$ represents a lower alkyl group; and $R^4$ represents lower alkinyl or lower alkenyl.

In practicing the process outlined above, 3-methoxy-9β-estradiol or 3-methoxy-1-methyl-9β-estradiol (I) obtained as described in our copending patent application Serial No. 210,211, filed on July 16, 1962, is reduced with lithium in liquid ammonia to the $\Delta^{2,5(10)}$-19-nor-9β-androstadiene (II), which upon mild acid hydrolysis, preferably by treatment with oxalic acid in aqueous methanol, at reflux temperature and for a period of time in the order of 1 hour affords the $\Delta^{5(10)}$-19-nor-9β-androsten-17β-ol and the 1-methyl derivative thereof (II: R═H). Conventional esterification of the latter compounds with carboxylic acid anhydrides or chlorides of less than 12 carbon atoms in pyridine solution produces the respective esters (III: R═acyl).

In order to obtain the 17α-alkyl-$\Delta^{5(10)}$-19-nor-9β-androstenes, 3-methoxy-9β-estradiol or its 1-methyl derivative (I) are oxidized with chromium trioxide in aqueous acetic acid or with the chromium trioxide-pyridine complex to 3-methoxy-9β-estrone or 3-methoxy-1-methyl-9β-estrone (IV). By treatment of these compounds with an alkyl magnesium halide such as methyl magnesium bromide, ethyl magnesium iodide, propyl magnesium bromide and the like, or with an alkyl lithium, such as methyl lithium, there are produced the 17α-alkyl-17β-hydroxy-9β-estratrienes (V). Upon reduction of the phenolic ring with lithium in liquid ammonia followed by hydrolysis with oxalic acid in aqueous methanol as described previously, there are produced the 17α-alkyl derivatives of $\Delta^{5(10)}$-19-nor-9β-androsten-17β-ol-3-one as well as the corresponding 1-methyl substituted compounds (VI).

By reaction of 3-methoxy-9β-estrone and 3-methoxy-1-methyl-estrone with ethyl orthoformate in dioxane solution and in the presence of an acid catalyst, such as p-toluenesulfonic acid, there are produced the 17,17-diethoxy derivatives (VII). These compounds are then reduced with lithium in liquid ammonia followed by selective hydrolysis of the 17,17-diethoxy moiety, thus affording the 17-keto-$\Delta^{2,5(10)}$-19-nor-9β-anadrostadienes (VIII). This selective hydrolysis is effected by reaction with oxalic acid in methylene chloride-methanol solution, at room temperature and for a short period of time, preferably for 5 minutes.

Upon treatment of the latter compounds with an alkinyl magnesium halide or with sodium or potassium acetylide followed by hydrolysis with oxalic acid in aqueous methanol, at reflux temperature, there are produced the 17α-alkinyl-$\Delta^{5(10)}$-19-nor-9β - androstenes (IX:$R^4$=alkinyl).

By selective partial hydrogenation of the triple bond using palladium-calcium carbonate as catalyst and pyridine as solvent, there are produced the 17α-alkenyl-$\Delta^{5(10)}$-19-nor-9β androstenes (IX:$R^4$=alkenyl).

In order to obtain the esters of the 17α-substituted androstene derivatives of the present invention, there is followed the method illustrated by the following sequence of reactions:

The 17α-alkyl, alkenyl and alkinyl derivatives of $\Delta^{5(10)}$-19-nor 9β-androsten-17β-ol-3-one, which may be further substituted at C-1 by a methyl group (X) are reduced with sodium borohydride in aqueous methanol solution, at room temperature overnight, to the corresponding 3-alcohols (XI) which are then converted into the respective diesters (XII) by reaction with carboxylic acid anhydrides of less than 12 carbon atoms in benzene solution and in the presence of p-toluenesulfonic acid.

The 3-acyloxy group is then selectively hydrolyzed by reaction with potassium carbonate in methanol solution, at room temperature or with 1% methanolic potassium hydroxide solution at 0° C. Upon oxidation of the resulting 3-alcohols (XIII) with chromium trioxide-pyridine complex, there are produced the esters of the 17α-alkyl, alkenyl and alkinyl derivatives of $\Delta^{5(10)}$-19 - nor - 9β-androsten-17β-ol - 3 - one as well as the corresponding 1α-methyl compounds (XIV).

The $\Delta^{5(10)}$-19-nor-9β-pregnene compounds of the present invention are obtained by the process illustrated by the following sequence of reactions.

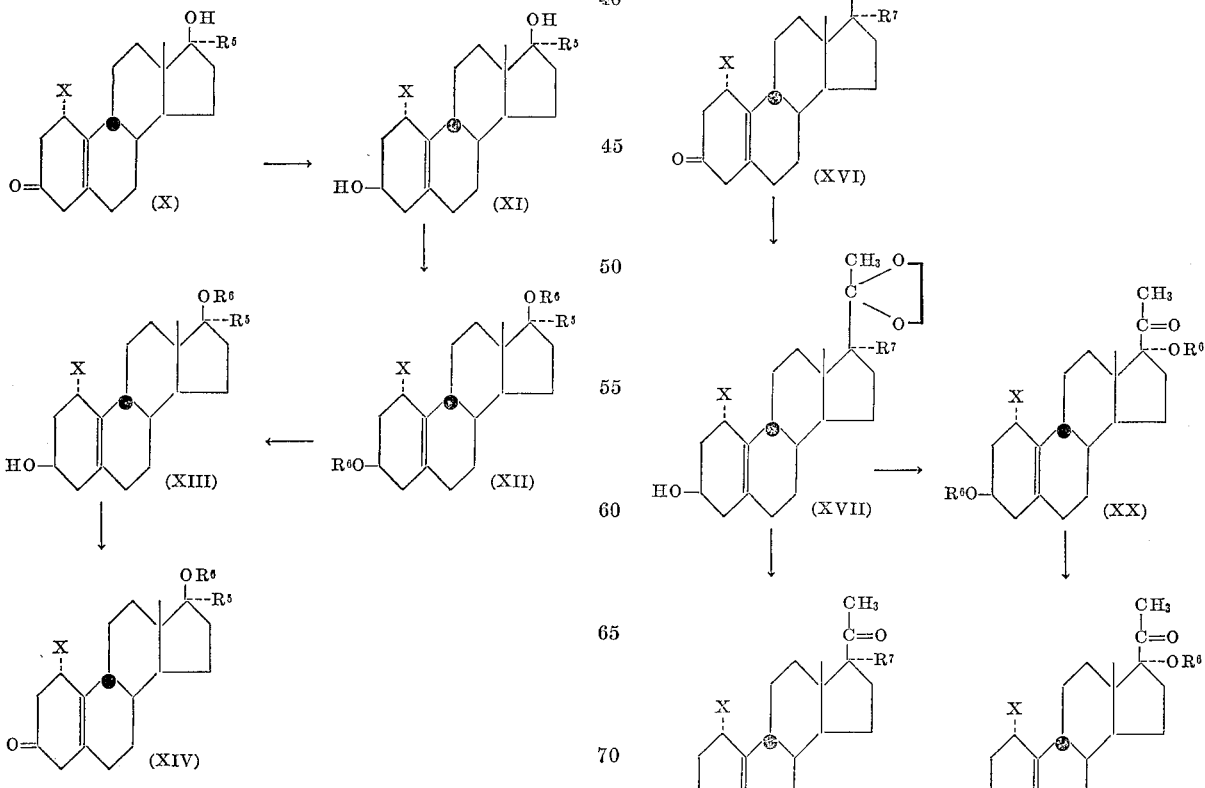

In the above formulas, X has the same meaning as heretofore set forth; $R^5$ represents a lower alkyl, lower alkenyl or lower alkinyl group and $R^6$ represents an acyl group of less than 12 carbon atoms.

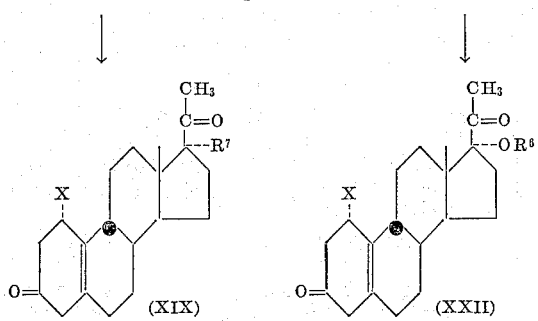

In the above formulas X and $R^6$ have the same meaning as heretofore set forth and $R^7$ represents hydrogen or hydroxy.

In practicing the process outlined above, 3-methoxy-20-ethylenedioxy-$\Delta^{1,3,5(10)}$-19-nor-9β-pregnatrien, 3-methoxy-20-ethylenedioxy-$\Delta^{1,3,5(10)}$-19-nor-9β-pregnatrien-17α-ol, and the 1-methyl derivatives thereof (XV), obtained as described in our copending application Serial No. 210,211 filed on July 16, 1962, are reduced with lithium in liquid ammonia followed by hydrolysis of the $\Delta^{2,5(10)}$-intermediates to give the 20-ethylenedioxy-3-keto-$\Delta^{5(10)}$-19-nor-9β-pregnene compounds (XVI). In order to avoid shifting of the $\Delta^{5(10)}$-double bond to form the α,β-unsaturated ketone, prior to the hydrolysis of the 20-ketal, the 3-keto group is reduced with sodium borohydride in methanol solution; the resulting 3-hydroxy-20-ethylenedioxy compound (XVII) is treated overnight with p-toluenesulfonic acid in acetone, thus regenerating the 20-keto group (XVIII). Upon oxidation of the above compounds with chromium trioxide-pyridine, there are produced $\Delta^{5(10)}$-19-nor-9β-pregnene-3,20-dione, $\Delta^{5(10)}$-19-nor-9β-pregnen-17α-ol-3,20-dione and the corresponding 1α-methyl derivatives (XIX).

The esters of the 17α-hydroxy-pregnenes (XXII) are obtained by treatment of (XVII) with carboxylic acid anhydrides of less than 12 carbon atoms in benzene solution and in the presence of p-toluenesulfonic acid to give the 3,17-diesters (XX), with simultaneous hydrolysis of the 20-ethylenedioxy group; selective saponification at C-3 with dilute potassium hydroxide in methanol solution at 0° C. to give the 17-monoesters (XXI) and oxidation of the 3-hydroxyl group with chromium trioxide in pyridine.

The following specific examples serve to illustrate, but are not intended to limit the scope of the present invention:

Example I

A cold solution of 2 g. of 3-methoxy-9β-estradiol in 250 cc. of anhydrous ether was slowly added to a stirred solution of 2.6 g. of lithium metal in 300 cc. of liquid ammonia. The mixture was stirred for 30 minutes further, 60 cc. of absolute ethanol were added carefully (until decolorization) and then the ammonia and ether were evaporated. Water was added to the residue and the solid collected by filtration and washed with water, thus giving 3-methoxy-$\Delta^{2,5(10)}$-9β-estradien-17β-ol.

A solution of 2 g. of the preceding compound in 80 cc. of methanol was treated with a solution of 2 g. of oxalic acid in 20 cc. of water. The reaction mixture was left at room temperature for 1 hour, diluted with water and the formed precipitate collected by filtration, washed and dried. Crystallization from acetone-hexane gave the pure $\Delta^{5(10)}$-19-nor-9β-androsten-17β-ol-3-one.

Example II

A solution of 5 g. of 3-methoxy-9β-estradiol in 100 cc. of pyridine was cautiously added to a mixture of 5 g. of chromic acid and 100 cc. of pyridine, maintaining the temperature between 10 and 15° C. The reaction mixture was allowed to stand at room temperature for 18 hours, diluted with ethyl acetate and filtered through celite. The filtrate was washed several times with water, dried over anhydrous sodium sulfate and evaporated to dryness under vacuum. Crystallization of the residue from acetone-hexane afforded 3-methoxy-9β-estrone.

A solution of 1 g. of the foregoing compound in 250 cc. of thiophene free benzene was treated with 27.5 cc. of 4 N-methyl-magnesium bromide in ether and the mixture refluxed with exclusion of moisture for 3 hours. The cooled mixture was cautiously poured over dilute hydrochloric acid and the product isolated by ethyl acetate extraction.

The extract was washed with water, dried over anhydrous sodium sulfate and evaporated to dryness. Crystallization of the residue from acetone-ether gave 17α-methyl-3-methoxy-9β-estradiol.

The above compound was then reduced with lithium in liquid ammonia in accordance with the method of Example I, thus affording 3-methoxy-17α-methyl-$\Delta^{2,5(10)}$-9β-estradien-17β-ol, which upon treatment with oxalic acid in aqueous methanol gave 17α-methyl-$\Delta^{5(10)}$-19-nor-9β-androsten-17β-ol-3-one.

Example III

The preceding example was repeated but using ethyl and propylmagnesium bromide instead of methylmagnesium bromide. There were thus produced as final products 17α-ethyl-$\Delta^{5(10)}$-19-nor-9β-androsten-17β-ol-3-one and 17α-propyl-$\Delta^{5(10)}$-19-nor-9β-androsten-17β,-ol-3-one.

Example IV

A mixture of 5 g. of 3-methoxy-9β-estrone, 50 cc. of dioxane, 5 cc. of ethyl orthoformate and 0.5 g. of p-toluenesulfonic acid was kept at room temperature for 1 hour. It was then diluted with water, extracted with ether and the organic extract washed with sodium carbonate and water to neutral, dried over anhydrous sodium sulfate and evaporated to dryness. Crystallization of the residue from ether-pentane afforded the diethylketal of 3-methoxy-estrone.

The above compound was then reduced with lithium in liquid ammonia to produce 3-methoxy-17,17-diethoxy-$\Delta^{2,5(10)}$-9β-estradiene.

A solution of 2 g. of the foregoing compound in 10 cc. of methylene chloride and 2 cc. of methanol was treated with 0.5 g. of oxalic acid and the reaction mixture left at 20° C. for 5 minutes. It was then diluted with water, extracted with methylene chloride and the organic extract washed to neutral, dried and evaporated to dryness. The solid residue, dissolved in 50 cc. of benzene, was added under nitrogen atmosphere to a solution of potassium teramilate (prepared by dissolving 1.4 g. of potassium in 30 cc. of teramyl alcohol). A slow stream of purified acetylene was passed through the solution during 40 hours; it was then diluted with water and the benzene layer separated, washed to neutral, dried over anhydrous sodium sulfate and evaporated to dryness.

The residue was dissolved in 30 cc. of methanol, 1 g. of oxalic acid dissolved in 5 cc. of water was added and the mixture refluxed for 45 minutes; it was then poured into water, extracted with methylene chloride and the extract washed to neutral, dried and evaporated to dryness. Chromatography of the residue on 50 g. of washed alumina gave 17α-ethinyl-$\Delta^{5(10)}$-19-nor-9β-androsten-17β-ol-3-one.

Example V

A mixture of 1 g. of $\Delta^{5(10)}$-19-nor-9β-androsten-17β-ol-3-one, 5 cc. of pyridine and 5 cc. of propionic anhydride was allowed to react at room temperature overnight; it was poured into water and the formed precipitate collected by filtration thus producing the propionate of $\Delta^{5(10)}$-19-nor-9β-androsten-17β-ol-3-one.

By the same method of esterification but using acetic, caproic and cyclopentylpropionic anhydride as esterifying agents there were obtained the respective esters.

Example VI

A solution of 2 g. of sodium borohydride in 5 cc. of water was added to an ice-cooled solution of 2 g. of 17α-methyl-$\Delta^{5(10)}$-19-nor-9β-androsten-17β-ol-3-one in 120 cc. of methanol and the mixture was allowed to stand for 16 hours at room temperature. The excess reagent was decomposed by addition of acetic acid, the solution concentrated to small volume in vacuo and diluted with water. The product was extracted with ethyl acetate, the extract was washed with water, dried and evaporated. The solid residue was purified by crystallization from acetone-hexane to give 17α-methyl-$\Delta^{5(10)}$-19-nor-9β-androstene-3β, 17β-diol.

To a solution of 1 g. of the preceding compound in 20 cc. of anhydrous benzene there were added 200 mg. of p-toluenesulfonic acid and 4 cc. of acetic anhydride and the mixture was kept at room temperature during 24 hours. It was poured into ice water and stirred for 30 minutes to hydrolyze the excess of anhydride. The benzene layer was separated, washer with 5% sodium carbonate solution and with water to neutral, dried over anhydrous sodium sulfate and evaporated to dryness. The residue was crystallized from acetone-ether thus giving the diacetate of 17α-methyl-$\Delta^{5(10)}$-19-nor-9β-androstene-3β,17β-diol.

A suspension of 1 g. of the foregoing compound in 60 cc. of methanol was treated with a solution of 0.5 g. of potassium carbonate in 6 cc. of water; the mixture was stirred at room temperature for 1 hour and then cooled in ice and diluted with water. The formed precipitate was collected by filtration and air dried.

The crude 17-acetate of 17α-methyl-$\Delta^{5(10)}$-19-nor-9β-androstene-3β,17β-diol was dissolved in 20 cc. of pyridine and added to a mixture of 1 g. of chromium trioxide in 20 cc. of pyridine. The reaction mixture was kept at room temperature overnight. It was then diluted with ethyl acetate, filtered through celite and the filtrate washed well with water, dried and evaporated to dryness. Crystallization from acetone-ether gave the acetate of 17α-methyl-$\Delta^{5(10)}$-19-nor-9β-androsten-17β-ol-3-one.

By the same method, 17α-ethyl-$\Delta^{5(10)}$-19-nor-9β-androsten-17β-ol-3-one and 17α-ethinyl-$\Delta^{5(10)}$-19-nor-9β-androsten-17β-ol-3-one were converted into the corresponding acetates.

Example VII

A solution of 1 g. of 17α-ethinyl-$\Delta^{5(10)}$-19-nor-9β- androsten-17β-ol-3-one in 40 cc. of pyridine was hydrogenated at 25° C. and 570 mm. in the presence of 400 mg. of pre-hydrogenated 2% palladium calcium carbonate catalyst.

When 1.1 molar equivalent of hydrogen had been absorbed, the reaction was stopped, the catalyst separated by filtration through celite, washed with ethyl acetate and the combined solutions evaporated to dryness in vacuo, yielding the crude vinyl derivative. This crude product was dissolved in ethyl acetate, the organic solution washed several times with water to eliminate the traces of pyridine, dried and evaporated to dryness. Recrystallization of the residue from acetone gave the pure 17α-vinyl-$\Delta^{5(10)}$-19-nor-9β-androsten-17β-ol-3-one.

The foregoing compound was then subjected to the reactions described in Example VI, to give as final product the acetate of 17α-vinyl-$\Delta^{5(10)}$-19-nor-9β-androsten-17β-ol-3-one.

Example VIII

Examples I and V were repeated but using as starting material 1-methyl-3-methoxy-9β-estradiol, thus producing 1α-methyl-$\Delta^{5(10)}$-19-nor - 9β - androsten - 17β-ol-3-one, its acetate, propionate and caproate.

Example IX

In the method of Example II there was used 1-methyl-3-methoxy-9β-estradiol instead of 3-methoxy-9β-estradiol as starting material, thus obtaining as final product 1α,17α-dimethyl-$\Delta^{5(10)}$-19-nor-9β-androsten-17β-ol-3-one.

Example X

A solution of 1.5 g. of 3-methoxy-20-ethylenedioxy-$\Delta^{1,3,5(10)}$-19-nor-9β-pregnatriene in 200 cc. of anhydrous ether was cooled to −10° C. and added to a stirred solution of 2 g. of lithium metal in 220 cc. of liquid ammonia. The mixture was stirred for 30 minutes further, 45 cc. of absolute methanol were added carefully (until decolorization) and the ammonia was evaporated. It was then diluted with water, extracted with ether and the combined extracts washed with water to neutral, dried and evaporated to dryness. The residue was dissolved in 60 cc. of methanol. A solution of 1 g. of oxalic acid in 10 cc. of water was added and the mixture refluxed for 45 minutes, poured into water. Extracted with ethyl acetate and the organic extract washed to neutral, dried and evaporated to dryness.

The crude 20-ethylenedioxy-$\Delta^{5(10)}$-19-nor-9β-pregnen-3-one thus obtained (1 g.), was dissolved in 90 cc. of methanol, a solution of 1 g. of sodium borohydride in 3 cc. of water was added and the mixture allowed to stand for 16 hours at room temperature. The excess reagent was decomposed by addition of acetic acid, the solution concentrated to a small volume in vacuo and diluted with water. The product was extracted with ethyl acetate, the extract was washed with water, dried and evaporated. The solid residue was purified by crystallization from acetone-hexane to give 20-ethylenedioxy-$\Delta^{6(10)}$-19-nor-9β-pregnen-3β-ol.

500 mg. of the preceding ketal were dissolved in 30 cc. of acetone, treated with 50 mg. of p-toluenesulfonic acid, and the reaction mixture kept at room temperature overnight. It was then poured into ice water, extracted with ethyl acetate and the organic extract washed with water to neutral, dried and evaporated to dryness. Addition of ether gave $\Delta^{5(10)}$-19-nor-9β-pregnen-3β-ol-20-one.

A solution of 300 mg. of the foregoing compound in 6 cc. of pyridine was added to a mixture of 300 mg. of chromium trioxide in 6 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded $\Delta^{5(10)}$-19-nor-9β-pregnene-3,20-dione.

In a similar manner starting from 3-methoxy-20-ethylenedioxy-$\Delta^{1,3,5(10)}$-19-nor - 9β - pregnatrien - 17α-ol there were obtained successively: 20-ethylenedioxy - $\Delta^{5(10)}$ - 19-nor-9β-pregnen - 17α-ol-3-one, 20-ethylenedioxy-$\Delta^{5(10)}$-19-nor-9β-pregnene-3β,17α-diol, $\Delta^{5(10)}$-19-nor-9β - pregnene-3β,17α-diol-20-one and $\Delta^{5(10)}$-19-nor-9β-pregnen - 17α-ol-3,20-dione.

Example XI

To a solution of 1 g. of 20-ethylenedioxy-$\Delta^{5(10)}$-19-nor-9β-pregnene-3β,17α-diol, in 40 cc. of anhydrous benzene there were added 200 mg. of p-toluenesulfonic acid and 4 cc. of acetic anhydride and the mixture kept at room temperature for 24 hours. It was poured into ice water and the mixture stirred to effect hydrolysis of the excess of anhydride. The benzene layer was separated, washed with 10% sodium carbonate solution and water, and dried over anhydrous sodium sulfate. After evaporation of the solvent and crystallization of the residue from ether-hexane there was obtained the diacetate of $\Delta^{5(10)}$-19-nor-9β-pregnene-3β,17α-diol-20-one.

A cooled suspension of 750 mg. of the foregoing diacetate in 30 cc. of methanol, was treated under nitrogen atmosphere with 150 mg. of potassium hydroxide dissolved in 1 cc. of water. The mixture was stirred at 0° C. for 1 hour, the resulting solution was poured into water and the solid precipitate collected by filtration to produce the 17 monoacetate of $\Delta^{5(10)}$-19-nor-9β-pregnene-3β,17α-diol-20-one, which was purified by crystallization from acetone-ether.

The above compound was oxidized with chromium trioxide in pyridine by following the method of Example VI, thus affording the acetate of $\Delta^{5(10)}$-19-nor-9β-pregnen-17α-ol-3,20-dione.

By the same method but using propionic, caproic and enanthic anhydrides as esterifying agents there were obtained the propionate, caproate and enanthate of $\Delta^{5(10)}$-19-nor-9β-pregnen-17α-ol-3,20-dione.

*Example XII*

Example X was repeated but using as starting material 1-methyl-3-methoxy-20-ethylenedioxy-$\Delta^{1,3,5(10)}$-19-nor-9β-pregnatriene, thus producing successively 1-methyl-20-ethylenedioxy-$\Delta^{5(10)}$-19-nor-9β-pregnen-3-one, 1-methyl-20-ethylenedioxy-$\Delta^{5(10)}$-19-nor-9β-pregnen-3β-ol, 1-methyl-$\Delta^{5(10)}$-19-nor-9β-pregnen-3β-ol-20-one and 1-methyl-$\Delta^{5(10)}$-19-nor-9β-pregnene-3,20-dione.

We claim:
1. $\Delta^{5(10)}$-19-nor-9β-pregnen-17α-ol-3,20-dione.
2. A compound of the following formula:

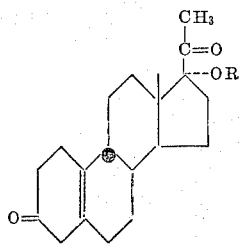

wherein R represents a hydrocarbon carboxylic acyloxy group of less than 12 carbon atoms.

3. The acetate of $\Delta^{5(10)}$-19-nor-9β-pregnen-17α-ol-3,20-dione.
4. The propionate of $\Delta^{5(10)}$-19-nor-9β-pregnen-17α-ol-3,20-dione.
5. The caproate of $\Delta^{5(10)}$-19-nor-9β-pregnen-17α-ol-3,20-dione.
6. The enanthate of $\Delta^{5(10)}$-19-nor-9β-pregnen-17α-ol-3,20-dione.
7. 1-methyl-$\Delta^{5(10)}$-19-nor-9β-pregnene-3,20-dione.

References Cited by the Examiner

UNITED STATES PATENTS

| | | | |
|---|---|---|---|
| 2,725,389 | 11/1952 | Colton | 260—397.4 |
| 2,905,676 | 9/1959 | Colton | 260—397.4 |
| 3,062,713 | 11/1962 | Ruggieri et al. | 260—397.4 |
| 3,062,713 | 11/1962 | Ruggieri et al. | 260—397.4 |
| 3,069,421 | 12/1962 | Nomine et al. | 260—397.4 |
| 3,102,125 | 8/1963 | Kincl et al. | 260—397.4 |
| 3,138,617 | 6/1964 | Nomine et al. | 260—397.4 |

LEWIS GOTTS, *Primary Examiner.*